United States Patent [19]
Maiwald et al.

[11] 3,981,967
[45] Sept. 21, 1976

[54] PROCESS FOR THE RECOVERY OF BOUND MERCURY FROM MERCURY-CONTAINING CATALYSTS

[75] Inventors: Heinz Maiwald; Gunter Hockele; Hermann Sauer, all of Marl, Germany

[73] Assignee: Chemische Werke Huls Aktiengesellschaft, Marl, Germany

[22] Filed: Nov. 3, 1971

[21] Appl. No.: 195,378

[30] Foreign Application Priority Data
Nov. 4, 1970    Germany............................ 2054102

[52] U.S. Cl................................. 423/107; 423/103; 423/491
[51] Int. Cl.².......................................... C01G 13/04
[58] Field of Search ............ 423/99, 491, 493, 107, 423/103, 22, 59; 23/87

[56] References Cited
UNITED STATES PATENTS
1,984,164    12/1934    Stock ................................... 423/491

FOREIGN PATENTS OR APPLICATIONS
1,205,705    11/1965    Germany ........................... 423/103
1,121,845    7/1968    United Kingdom................. 423/107

*Primary Examiner*—Edward Stern
*Attorney, Agent, or Firm*—Millen, Raptes & White

[57] ABSTRACT

An improved process for the recovery of mercury from exhausted mercury-containing catalyst by heating the inactive catalyst at 270°–600°C. while passing a carrier gas therethrough, which comprises pretreating the exhausted catalyst with chlorine.

8 Claims, 1 Drawing Figure

U.S. Patent   Sept. 21, 1976   3,981,967
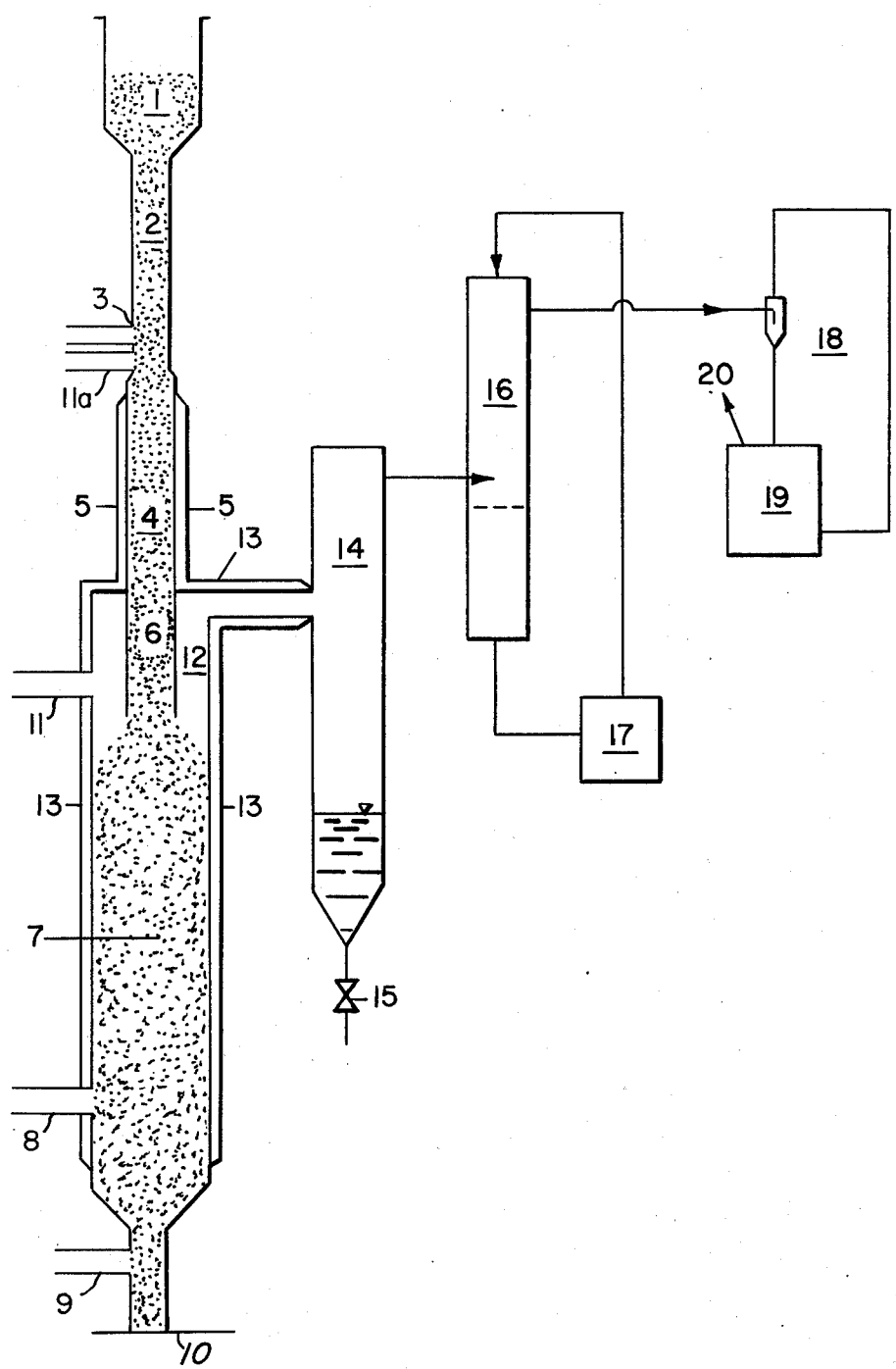
INVENTORS
HEINZ MAIWALD
GÜNTER HÖCKELE
HERMAN SAUER
Millen, Raptes & White
ATTORNEYS

PROCESS FOR THE RECOVERY OF BOUND MERCURY FROM MERCURY-CONTAINING CATALYSTS

BACKGROUND OF THE INVENTION

This invention relates to an improved process for the recovery of bound mercury from exhausted mercury-containing catalysts.

In German Pat. DAS No. 1,205,705 there is described a process and apparatus for the recovery of metallic and/or bound mercury from inactive, mercury-containing catalysts in which the catalysts are heated to 270°–600° C. while passing therethrough a carrier gas, preferably hydrogen, at the same temperature range, preferably 270°–350° C. The mixture of carrier gas and desorption gas is then withdrawn and cooled. The mercury is recovered in the form of metallic mercury. In contrast thereto, if the thus-recovered mercury is to be produced in the form of mercury(II) chloride, chlorine is introduced into the mixture of the carrier gas and the desorption gas prior to the cooling thereof, and the temperature is preferably maintained at 300°–400° C. during the desorption.

As a result of their particular use, the inactive, mercury-containing catalysts contain as impurities varying amounts of various organic compounds. In the process described by the German patent, these impurities result particularly during the recovery of mercury in the form of mercury(II) chloride and primarily at the outlet of the reactor and in the wet section of the plant, in the deposition of carbon black and solid and oily organic compounds, along with undesired metallic mercury and insoluble mercury(I) chloride.

It is an objective of the present invention to prevent these depositions and thus improve the recovery of mercury(II) chloride. Other objects will be apparent to those skilled in the art to which this invention pertains.

SUMMARY OF THE INVENTION

According to this invention, bound mercury, especially mercury(II) chloride, are recovered from mercury-containing exhausted catalysts, in a process in which the catalysts are heated at 270°–600° C. while passing a carrier gas therethrough and the mixture of carrier and desorption gases is then withdrawn and cooled, by pretreating the inactive catalyst with chlorine at temperatures of 100°–300° C., preferably at 150°–270° C. In this process, the deposition of carbon black and organic solid products and the formation and precipitation of mercury and insoluble mercury(I) chloride is avoided.

Since these deposits could not be removed using an excess of chlorine during the chlorination of the hot desorption gases, it was surprising that pre-treatment of the catalyst according to the process of this invention was successful in doing so.

Reaction temperature control is preferably conducted in that part of the plant where the chlorinating pretreatment of the catalyst occurs, preferably by dilution of the chlorine with an inert gas, preferably nitrogen, e.g., in a volume ratio of 1:1 to 1:20, preferably 1:3 to 1:8.

A preferred embodiment of this invention is to carry out the chlorinating pretreatment in co-current with the continuous catalyst flow.

For the pretreatment of the inactive catalyst according to this invention, a separate plant can be employed in a batch-wise or continuous mode of operation. However, in a preferred embodiment in the process of this invention, the chlorinating pretreatment is conducted in the continuous catalyst recovery process described in German Pat. No. 1,205,705 by effecting a change in the process in the zone of the lower portion of the feed pipe.

As shown in the drawing, which is a schematic illustration of apparatus useful for conducting the process of this invention, the inactive catalyst flows from a storage vessel 1 for inactive catalyst via a feed pipe 2 into a pipe 4 which is externally heated to 300°–500° C., preferably 350°–450° C., by a heating unit 5. A nitrogen inlet pipe 3 (nitrogen barrier) is disposed in the lower zone of feed pipe 2. Between the nitrogen inlet pipe 3 and the preheating zone provided by pipe 4 and external outer wall heating unit 5, chlorine is introduced through a feed line 11a for pretreating the inactive catalyst at the point at which a temperature gradient exists, as a result of heating unit 5 of the preheating zone 4, so that the spent catalyst is pretreated with chlorine at from 100° to 300° C., preferably from 150° to 270° C. These temperatures can also be maintained in the chlorination pretreatment reaction zone by diluting the chlorine with an inert gas, preferably nitrogen. By diluting the chlorine with an inert gas, the strongly exothermic reaction of the chlorination by the impurities, in the form of various organic compounds, present on the inactive catalyst, is throttled and the heat of reaction is removed in a more advantageous manner.

The subsequent parts of the plant with the extension pipe 6, the desorption vessel 7, the chlorine feed line 11 in the chlorinating chamber 12, and the external heating outer wall unit 13, as well as the further devices not represented herein, are identical with the apparatus as illustrated and described in German Pat. No. 1,205,705, the disclosure of which is incorporated by reference herein, the drawing of which corresponds exactly to that of the instant application, except for the provision of a chlorine feed line for the chlorination pretreatment. In particular, the desorption vessel 7 is provided with a gas supply 8 for air or oxygen, a gas supply 9 for nitrogen, and a metering unit 10. Connected to the desorption vessel 7 is a condensation tower 14 provided with emptying means 15 for removing condensed $HgCl_2$. For removing residual $HgCl_2$ there is provided scrubber 16 provided with hydrochloric acid recycle solution 17. Nitrogen is withdrawn from scrubber 16 by jet pump 18 which is operated with dilute caustic soda solution in the cycle 19, and is ventilated via ventilation means 20.

Without further elaboration, it is believed that one skilled in the art can, using the preceding description, utilize the present invention to its fullest extent. The following preferred specific embodiments are therefore to be construed as merely illustrative, and not limitative of the remainder of the disclosure in any way whatsoever.

EXAMPLE 1

In the above-described continuous plant and as shown in the drawing, spent activated carbon catalyst having a mercury(II) chloride content of 4.2%, is desorbed at a throughput rate of 48 kg./h. at 360°– 400° C. The preheating stage is externally controlled to be at 400°–450° C. At 3, 5 m³/h. of nitrogen is introduced. In order to pretreat the used catalyst, 0.75 m³/h. of chlorine is fed at 11a. One m³/h. of chlorine is introduced into the chlorinating chamber 12 via the feed line 11. The desorbed catalyst contains 0.04% of mercury at the outlet [discharge end], calculated as mercury(II) chloride. The desorbed mercury is obtained exclusively as mercury(II) chloride in an amount of 1.98 kg./h., corresponding to a yield of 98%. Neither metallic mercury nor insoluble mercury(I) chloride is obtained in this process, and the scrubbing plant remains free of carbon black and organic deposits. Under these conditions, the desorption of the used catalyst can be conducted in a continuous operation.

EXAMPLE 2

In the same plant and under identical conditions as in Example 1, an inactive catalyst charge having a mercury content of 4.5%, calculated as mercury(II) chloride, is desorbed continuously at a throughput of 45 kg. of catalyst per hour. For purposes of pretreatment, 0.75 m³/h. of chlorine is introduced at 11a and 1 m³/h. of chlorine is introduced into the chlorinating chamber 12. The thus-desorbed mercury is obtained quantitatively in the form of mercury(II) chloride in an amount of 1.96 kg./h., corresponding to a yield of 97%. The desorbed catalyst still contains 0.06% of mercury, calculated as mercury(II) chloride. Since neither organic solid products nor carbon black is separated, the plant can be conducted in a continuous mode of operation without difficulties.

COMPARATIVE EXAMPLE

The inactive catalyst charge as described in Example 1 is desorbed in the same plant omitting, however, the chlorinating pretreatment by the introduction of chlorine at 11a, but under otherwise identical conditions as set forth in Example 1, with a throughput of 48 kg. of used catalyst per hour. Instead of mercury(II)chloride, there is obtained predominantly insoluble mercury(I) chloride (calomel) and metallic mercury. In addition, organic solid products and carbon black are deposited at the gas outlet of the reactor 7 and in the scrubbing tower, resulting in the chlorinating chamber 12, which is customarily under a slight subatmospheric pressure, in a constant rise in pressure until there is an undesired discharge of the desorption gases which are very detrimental to health. Neither an increase of the amount of chlorine fed into the chlorinating chamber 12 from 1 m³/h. to 2.5 m³/h. nor the simultaneous reduction of the throughput of used catalyst to 25% of the ordinary amount (from 48 kg./h. to 12 kg./h.) eliminates the formation and deposition of mercury(I) chloride and mercury, as well as of carbon black and organic solid products. The ever-increasing clogging at the gas outlet of the reactor 7, as well as in the scrubbing tower, forces within a short period of time, the shutdown of the plant with subsequent disassembly and cleaning procedures.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the recovery of mercury (II) chloride from a spent activated carbon catalyst containing $HgCl_2$ and organic impurities comprising heating said catalyst to 270°–600°C while passing a carrier gas therethrough, withdrawing from said heated catalyst resultant gaseous mixture of carrier gas and desorbed mercury compounds; and introducing chlorine through a first inlet into the resultant withdrawn gaseous mixture containing HgCl to convert the HgCl to $HgCl_2$, the improvement which comprises a pretreatment step of contacting the spent catalyst with chlorine at a temperature of 100°–300°C prior to said heating of the catalyst to 270°–600°C while passing said carrier gas therethrough, the latter-mentioned chlorine being introduced through a second inlet separate and distinct from said first inlet, thereby avoiding depositions of carbon black and organic solid products and the formation and precipitation of metallic mercury and HgCl from the discharged carrier gas.

2. A process according to claim 1 wherein in the pretreatment step the inactive catalyst is contacted with chlorine at 150° to 270° C.

3. A process according to claim 1 wherein the chlorine in the pretreatment step is diluted with an inert gas in a volume ratio of 1:1 to 1:20.

4. A process according to claim 3 wherein the ratio of chlorine to inert gas in the pretreatment step is 1:3 to 1:8.

5. A process according to claim 4 wherein the inactive catalyst in the pretreatment step is treated with chlorine at 150° to 270°C.

6. A process as defined by claim 1 comprising the further step of cooling the withdrawn chlorinated gaseous mixture to condense out $HgCl_2$.

7. A process as defined by claim 1 wherein the $HgCl_2$ is present in a minor amount in the spent activated carbon catalyst.

8. A process as defined by claim 1 wherein said spent catalyst and chlorine in the pretreatment step are contacted with one another in a continuous co-current manner.

* * * * *